US009936683B2

(12) United States Patent
Saguchi et al.

(10) Patent No.: US 9,936,683 B2
(45) Date of Patent: Apr. 10, 2018

(54) SUSTAINED RELEASE PHEROMONE FORMULATION (71) Applicant: Shin-Etsu Chemical Co., Ltd., Tokyo (JP)

(72) Inventors: Ryuichi Saguchi, Joetsu (JP); Naoki Ishibashi, Joetsu (JP); Takehiko Fukumoto, Joetsu (JP); Satoshi Ogitani, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 98 days.

(21) Appl. No.: 14/071,154

(22) Filed: Nov. 4, 2013

(65) Prior Publication Data

US 2014/0123539 A1 May 8, 2014

(30) Foreign Application Priority Data

Nov. 8, 2012 (JP) ................. 2012-246445
May 7, 2013 (JP) ................. 2013-097470

(51) Int. Cl.
*A01M 1/02* (2006.01)
*A01M 31/06* (2006.01)
(Continued)

(52) U.S. Cl.
CPC ............ *A01M 1/02* (2013.01); *A01M 1/2055* (2013.01); *A01M 31/008* (2013.01); *A01M 31/06* (2013.01)

(58) Field of Classification Search
CPC .......... A01M 1/00; A01M 1/02; A01M 1/023; A01M 1/10; A01M 1/106
(Continued)

(56) References Cited

U.S. PATENT DOCUMENTS 4,379,372 A 4/1983 Alexander et al.
4,639,393 A 1/1987 Von Kohorn et al.
(Continued)

FOREIGN PATENT DOCUMENTS

JP 2-69902 5/1990
JP 2-69903 5/1990
(Continued)

OTHER PUBLICATIONS

European Search Report for Application No. EP 13 19 1150 dated Feb. 14, 2014.
(Continued)

*Primary Examiner* — Tien Q Dinh
*Assistant Examiner* — Aaron M Rodziwicz
(74) *Attorney, Agent, or Firm* — Alston & Bird LLP (57) ABSTRACT A sustained release pheromone formulation is provided in which once it is secured to a branch or other support, the likelihood of falling off is significantly reduced, and which is capable of being quickly attached to a small or large branch. The sustained release pheromone formulation includes a first and second sheet parts which are provided by bending a single polymer sheet so that they are arranged in a face-to-face manner, the sheet parts each having an engaging hole therethrough; a bend part located between the sheet parts; at least one sex pheromone substance carried on at least a part of the sheet parts; and slits each extending from the bend part to the engaging hole in each one of the sheet parts. This formulation can be secured to the rod-shaped support by guiding the rod-shaped support to the engaging holes via the slits and engaging with the holes.

11 Claims, 6 Drawing Sheets

(51) Int. Cl.
*A01M 31/00* (2006.01)
*A01M 1/20* (2006.01)

(58) Field of Classification Search
USPC ....... 43/107, 432.1, 122, 124; 424/405, 409, 424/411, 412, 413, 414, 415, 416
See application file for complete search history.

(56) References Cited

U.S. PATENT DOCUMENTS

| | | | |
|---|---|---|---|
| 4,715,536 | A | 12/1987 | Capizzi et al. |
| 5,316,148 | A * | 5/1994 | Neumann et al. ......... 206/484.1 |
| 5,975,427 | A * | 11/1999 | Harries ........................... 239/34 |
| 2008/0011871 | A1* | 1/2008 | Sexton ............................ 239/55 |
| 2011/0266361 | A1* | 11/2011 | Harmsen et al. ............... 239/55 |
| 2013/0318862 | A1* | 12/2013 | Lawrence et al. .............. 43/131 |

FOREIGN PATENT DOCUMENTS

| | | |
|---|---|---|
| JP | 05-005801 U | 1/1993 |
| JP | H10 153959 A | 6/1998 |
| JP | 2010-39156 A | 2/2010 |
| JP | 2012 185489 A | 9/2012 |
| JP | 2012185489 A * | 9/2012 |
| WO | WO 2006/105572 A1 | 10/2006 |
| WO | WO 2010/076316 A1 | 7/2010 |

OTHER PUBLICATIONS

Japanese Office Action for corresponding Japanese Patent Application No. JP 2013-231337 dated Jun. 3, 2016, with English translation, 8 pages.
Australian Office Action for corresponding Australian Patent Application No. 2013248249 dated Jul. 13, 2017.

* cited by examiner

ND RELEASE PHEROMONE
FORMULATION

FIELD

The present invention relates to a sustained release pheromone formulation. More specifically, this invention relates to a pheromone formulation which is capable of gradually releasing a pheromone substance suitable for insect pest control over a long period of time at a constant release rate and which is capable of being easily attached to a tree or other support.

BACKGROUND

There has been an increase in demand of pheromone formulations which have a reservoir in which a pheromone substance that is effective for insect pest control is contained, which are secured stably for a long period of time to a predetermined place, for example, in a farm field, and which are adapted to allow the pheromone substance in the reservoir to be released continuously and sustainedly into air. Thus, various proposals associated therewith have been made.

As a bag type pheromone formulations which is capable of being easily attached to a tree or other support, there have been proposed the formulation using a polymer bag in which a slit, having an engaging hole at the tip thereof, is cut from at least one edge of the polymer bag (Japanese Utility Model Application Unexamined Publication Nos. 2-69902 and 2-69903).

SUMMARY

However, such a pheromone formulation merely provided with an engaging hole at the tip of a slit suffers from the problem that it is very likely to fall off from a branch having no stopper such as a leaf or a branchlet when it is exposed to pressure by water during sprinkling and to wind. Furthermore, in order to prevent a falling off by such detachment from the engaging hole, an appropriate branch having a size that is suitable for the diameter of the hole has to be selected.

In view of the foregoing, the present invention provides a sustained release pheromone formulation that is not very likely to fall off from a tree branch or other support, once it is attached and secured to such a support, and which is capable of being quickly attached to large to small branches without any inconvenience.

The present invention provides a sustained release pheromone formulation comprising: a first sheet part and a second sheet part which are provided by bending a single polymer sheet so that the first and second sheets parts are arranged face-to-face, the first and second sheets each having an engaging hole therethrough; a bend part located between the first sheet part and the second part sheet; at least one sex pheromone substance that is carried on at least a part of the first and second sheet parts; and slits, each having a beginning end and a terminal end and extending therebetween, the beginning end being located at the bend part and the terminal end being located on each peripheral edge of the engaging holes in the first and second sheet parts; wherein the sustained release pheromone formulation can be secured to a rod-shaped support by guiding the rod-shaped support through the slits into the engaging holes and engaging the rod-shaped support with the engaging holes.

The sustained release pheromone formulation of the present invention is allowed to use two engaging holes. Thus, even if a tree branch, to which the sustained release pheromone formulation is attached and secured, has no stopper such as a leaf or a branchlet, the likelihood of displacement through the tree branch or falling off from the tree branch of the formulation because of exposure to severe weather or exposure to wind pressure or water pressure associated with plant cultivation is significantly reduced. The reduction of the likelihood of displacement from the initial placement position of the formulation is important since the initial placement positions are selected for achieving a uniform release concentration and the displacement therefrom results in uneven arrangement of formulations and prevents uniform release concentration. In addition, the sustained release pheromone formulation of the invention is of a very simple shape, so that it can be quickly attached to a big branch or a small branch.

DETAILED DESCRIPTION

The sustained release pheromone formulation may be embodied in various forms, the formulation comprising a first sheet part and a second sheet part which are provided by bending a single polymer sheet so that the first and second sheets parts are face-to-face arranged, the first and second sheets each having an engaging hole therethrough; a bend part located between the first sheet part and the second part sheet; at least one sex pheromone substance that is carried on at least a part of the first and second sheet parts; and slits, each having a beginning end and a terminal end and extending therebetween, the beginning end being located at the bend part and the terminal end being located on each peripheral edge of the engaging holes in the first and second sheet parts. For example, such various forms may include a sustained release pheromone formulation 10 illustrated in FIG. 1 that is provided by bending once a polymer sheet. FIG. 2 is a developed view of the sustained release pheromone formulation 10. The sustained release pheromone formulation 10 is provided by bending a single polymer sheet along the centerline thereof. The portion of the polymer sheet along which the sheet is bent is referred to as a bend part 3. The bend part 3 is located between a first sheet part 1 and a second sheet part 2, which are arranged in a face-to-face manner. The first and second sheet parts 1 and 2 comprise engaging holes 7, 8 therethrough, and slits 4, 5, respectively. Each of slits 4, 5 extends from its beginning end located at the bend part 3 to its terminal end located on each peripheral edge of the engaging holes 7 and 8 in the first and second sheet parts 1 and 2. To secure the sustained release pheromone formulation 10 to a rod-shaped support such as a branch, the rod-shaped support is guided through the slits 4 and 5 to the engaging holes 7 and 8 with which the rod-shaped support is securely engaged.

Figure 1:
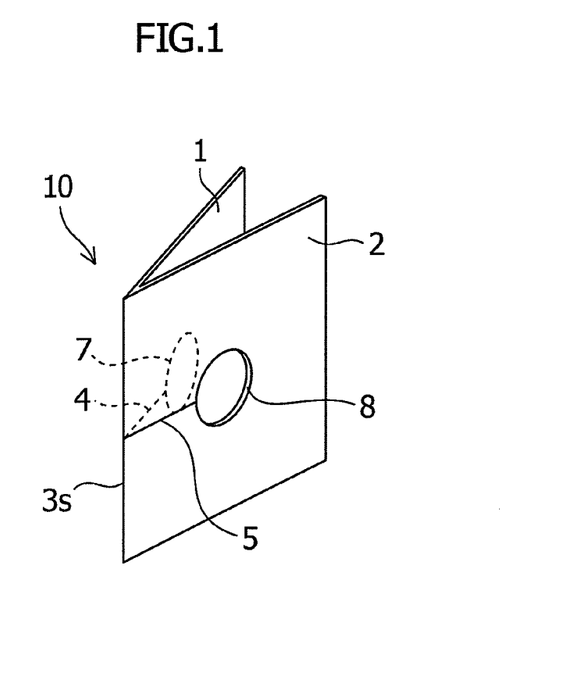
FIG. 1 illustrates one embodiment of a sustained release pheromone formulation that is provided by bending once a polymer sheet.
Figure 2:
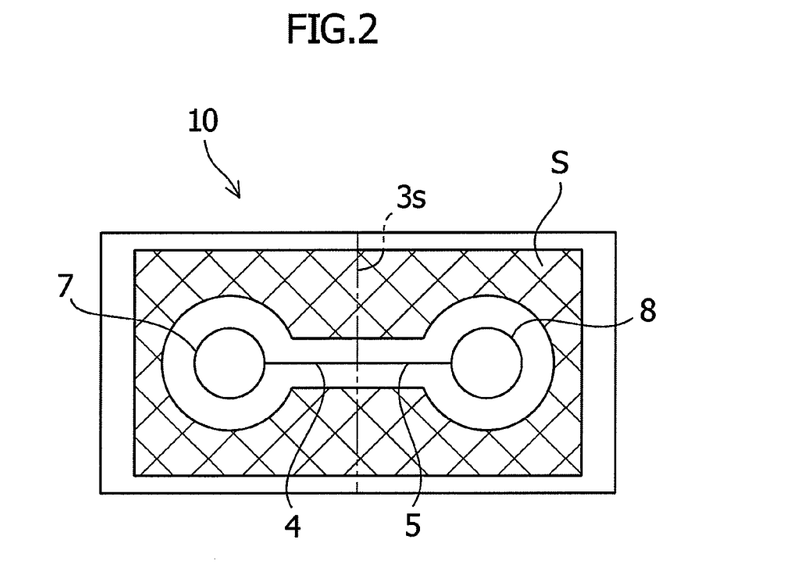
FIG. 2 is a developed view of the sustained release pheromone formulation illustrated in FIG. 1.

Regarding the overall shape of the sustained release pheromone formulation, FIG. 1 illustrates a shape that is formed by bending a rectangular polymer sheet. However, the present invention is not limited thereto. The sustained release pheromone formulation may be provided by bending a sheet having any other shape, such as a circular, oval, or polygonal shape. Alternatively, a polygonal sheet whose corners have been rounded may be used. From the viewpoint of producing polymer sheets, it is preferable that the sustained release pheromone formulation have an overall shape that is left-right (bilateral) symmetrical with respect to the bent part, i.e. that the sheet parts are a symmetrical pair. However, as long as a rod-shaped support can be engaged with the engaging holes, the sheet parts are not necessarily limited to be a symmetrical pair.

The overall size of the sustained release pheromone formulation may be any size on which an appropriate amount of sex pheromone substance to be released can be carried. It may be preferably 30 to 100 mm long and 50 to 300 mm wide.

FIG. 1 illustrates the engaging holes, each having a circular shape. However, the present invention is not limited thereto, and for example, the hole shape may be freely selected from a circle, an oval, a semicircle, a polygon such as a triangle, a rectangle, a diamond and a trapezoid, and any other type including a star and a sector. From the viewpoint of forming the engaging holes, it is preferable that the engaging holes have shapes that are bilaterally symmetrical with respect to the bent part, i.e., it is preferable that the engaging holes be a symmetrical pair. However, the present invention is not limited thereto, and the engaging holes may not be a symmetrical pair as long as they can engage with a rod-shaped support.

The size of the engaging hole may be freely selected taking into consideration the size of the intended rod-shaped support such as a tree branch to which the sustained release pheromone formulation is secured. When the engaging holes are round, it is preferable that the engaging holes have a diameter in the range from 8 to 30 mm. When the engaging holes are not round, it is preferable that the engaging holes have a size in which the circle having the diameter mentioned above can be contained.

Taking into consideration ease of guiding a rod-shaped support such as a tree branch to the engaging holes through the slits and engaging the rod-shaped support with the engaging holes, it is preferable that the engaging holes be formed at places which are located at the same distance from the bend part and which are bilaterally symmetrical with respect to the bent part. In other words, preferable positions for the engaging holes are positions at which the engaging holes are a symmetrical pair about the bent part. The distance from the bend part at which each engaging hole is provided is not particularly limited. However, taking into consideration a friction resistance when securing to the rod-shaped support such as a tree branch, and problems such as dropping and falling off of the formulation, it is preferable that the engaging hole be provided at a distance in the range 5 to 30 mm from the bend part.

Each slit that extends from the bend part to each engaging hole may be a single straight line that extends from its beginning end at the bend part to its terminal end on the peripheral edge of each engaging hole as illustrated in FIGS. 1 and 2. As well as such a single straight line, the slit may define any lines including a line with an angle, a curved line, and a combination thereof.

The length and position of each slit may be freely selected as long as the tree branch can reach from the bend part to the engaging holes. However, when symmetrically paired engaging holes are respectively provided in the first sheet part and the second sheet part, it is preferable that the slits be a symmetrical pair, from the viewpoint of cutting the slits.

The pheromone substance may have been kneaded into the polymer sheet. In this case, however, when a method is used in which engaging holes are cut out from a polymer sheet, the pheromone substance kneaded in the cutout parts are wasted. Preferably, the polymer sheet is a sheet provided by adhering two polymer films to one another. Thus, a sex pheromone substance can be contained in a bag-like space formed at a part or all of the area between the two polymer films. A pheromone substance may be contained in the polymer sheet, for example, by placing the pheromone substance at a desired part of one polymer film except a portion intended for forming the engaging hole, overlapping the other polymer film thereon, and applying heat or ultrasonic welding along the periphery of the desired part above. Alternatively, a pheromone substance may be contained in a polymer sheet by placing the pheromone substance at a desired part on a half area of a single polymer film except a portion intended for forming the engaging hole, then half-folding the polymer film so that the other half area of the polymer film is overlapped thereon, and applying heat welding or ultrasonic welding along the periphery of the desired part.

Placement of the pheromone substance can be easily performed by using a nonwoven fabric that is preferably impregnated with the pheromone substance. Also from the viewpoint of preventing inhomogeneous distribution of the pheromone substance and realizing uniform placement of the pheromone substance, it is preferable that a nonwoven fabric impregnated with the pheromone substance be used. The fiber material for forming the nonwoven fabric may be any material capable of retaining the pheromone substance. However, preferable fiber to be used includes, but is not limited to, natural fibers such as cotton fiber, and biodegradable resin fibers. The biodegradable resin includes condensation polymers produced from at least one dicarboxylic acid selected from the group consisting of oxalic acid, malonic acid, succinic acid, glutaric acid, adipic acid, sebacic acid, fumaric acid and maleic acid; and at least one polyol selected from the group consisting of ethylene glycol, propylene glycol, butanediol, pentanediol, hexanediol, octanediol and decanediol. The biodegradable resin further includes condensation polymers of at least one selected from the group consisting of lactic acid, hydroxyvaleric acid, hydroxycaproic acid and hydroxycapric acid; and aliphatic polyester type thermoplastics such as polycaprolactone obtained by ring-opening polymerization of E-caprolactone.

FIG. 2 exemplifies a region S, in which the pheromone substance is present (hereinafter, referred to as "pheromone region S"), in the sheet that is provided by adhering two polymer films to one another. In FIG. 2, each of the engaging holes is provided substantially at the middle of each half of the pheromone region S, but the present invention is not limited thereto. For example, to carry a greater amount of pheromone substance, the engaging holes may be formed at an upper part of the strip shape sheet, while a bag-like space is formed at a middle and/or lower part thereof. Then, the pheromone substance may be filled in the bag-like space, or placed in a nonwoven fabric.

The rod-shaped support to which the sustained release pheromone formulation will be secured may be any support that is capable of being guided to the engaging holes through the slits and being engaged with the engaging holes, so that the sustained release pheromone formulation can be secured thereto. The rod-shaped supports are generally, but not limited to, a tree branch and the like.

In addition to the sustained release pheromone formulation 10 illustrated in FIGS. 1 and 2, it may be embodied in various forms. Here, the sustained release pheromone formulation 10 having the bend part 3 which is a line 3s is referred to as a single-bent type, by way of example. The various forms above include the single-bent type sustained release pheromone formulation 10, a double-bent type sustained release pheromone formulation 20 having a bend part 3 which is a plane 3a illustrated in FIG. 3, a triple-bent type sustained release pheromone formulation 30 having a bend part 3 which is of two planes 3e and 3f illustrated in FIG. 4, and a U-type sustained release pheromone formulation 40 having a bend part 3 which is a curved plane 3r illustrated in FIG. 5. Furthermore, a loop type sustained release pheromone formulation 50 having a bend part 3 which is a curved plane 3r, where the opposite ends of the single polymer sheet are adhered to one another as illustrated in FIG. 6, may be used. Hereinafter, description of such embodiments will be given in which the same reference numerals are used to denote components or parts having functions similar to those of the first embodiment.

Figure 3:
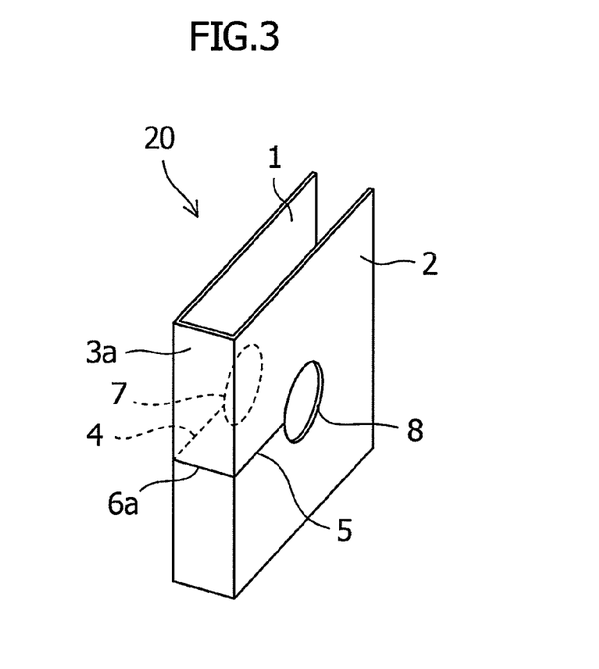
FIG. 3 illustrates one embodiment of a sustained release pheromone formulation in which the bend part thereof is defined by a single plane.
Figure 4:
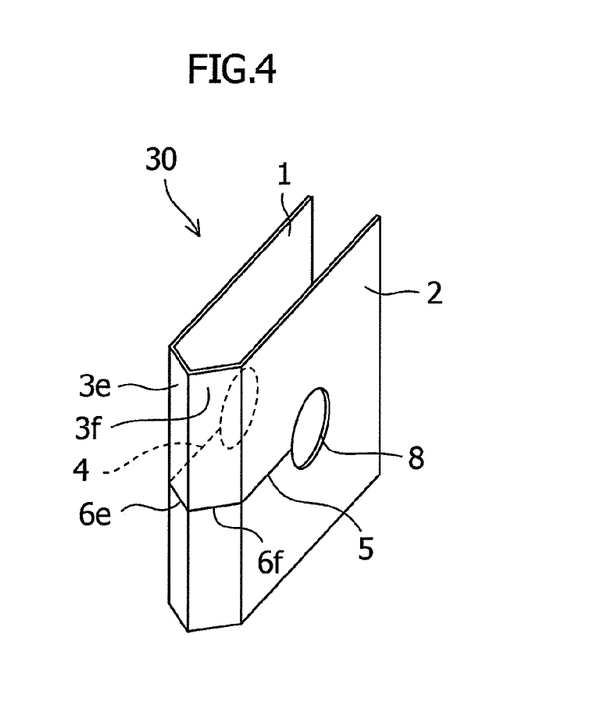
FIG. 4 illustrates one embodiment of a sustained release pheromone formulation in which the bend part thereof is defined by two planes.

The double-bent type sustained release pheromone formulation 20 illustrated in FIG. 3 has the bend part 3a that defines a single plane. In the bent part 3a, there is a slit 6a having a length as long as the width of the bend part 3a in the direction along the line extending between the two engaging holes. The triple-bent type sustained release pheromone formulation 30 illustrated in FIG. 4 has the bend part 3 which defines not a line, but defines two planes 3e and 3f. In the bend part, there are slits 6e and 6f in the two planes 3e and 3f. Each slit 6e, 6f has a length as long as the width of each plane 3e, 3f in the direction along the line extending between the two engaging holes.

Figure 5:
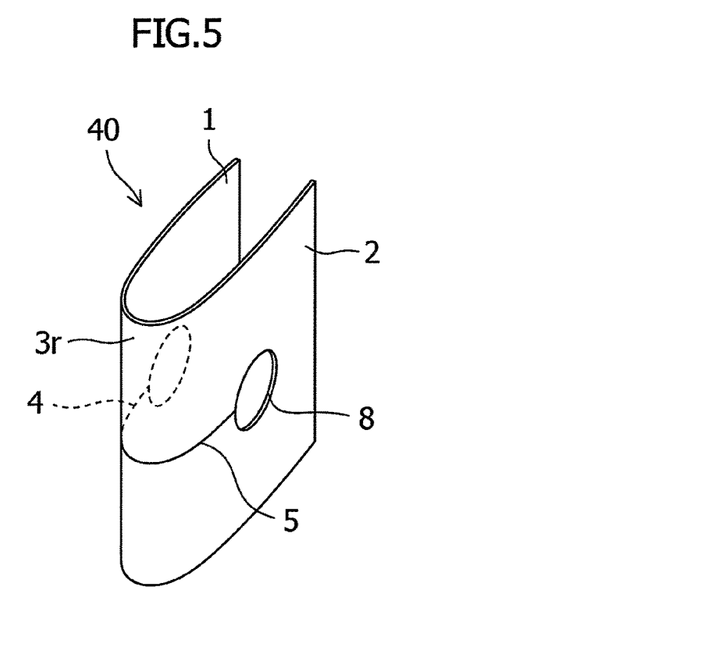
FIG. 5 illustrates one embodiment of a sustained release pheromone formulation in which the bend part thereof is defined by a curved plane.
Figure 6:
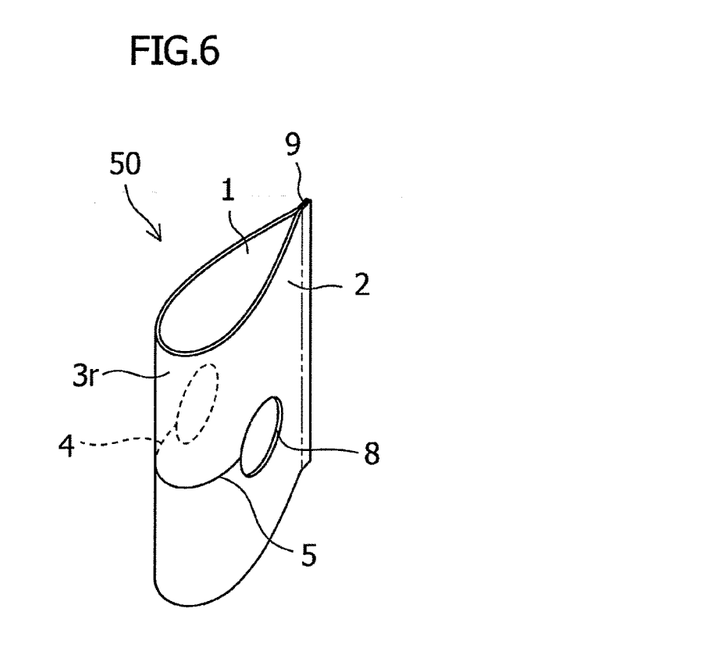
FIG. 6 illustrates one embodiment of a sustained release pheromone formulation in which the opposite ends of the polymer sheet thereof are adhered to one another.

The U-type sustained release pheromone formulation 40 illustrated in FIG. 5 is the same as the one illustrated in FIG. 1 except that the regions in the first and second sheet parts adjacent to the bend part are curved. The loop type sustained release pheromone formulation 50 illustrated in FIG. 6 has an joint part 9 which is provided by connecting the first sheet part 1 to the second sheet part 2 of the U-type sustained release pheromone formulation 40 illustrated in FIG. 5. At the joint part 9, the first sheet portion 1 and the second sheet portion 2 may be adhered using an adhesive or heat welding.

Figure 7:
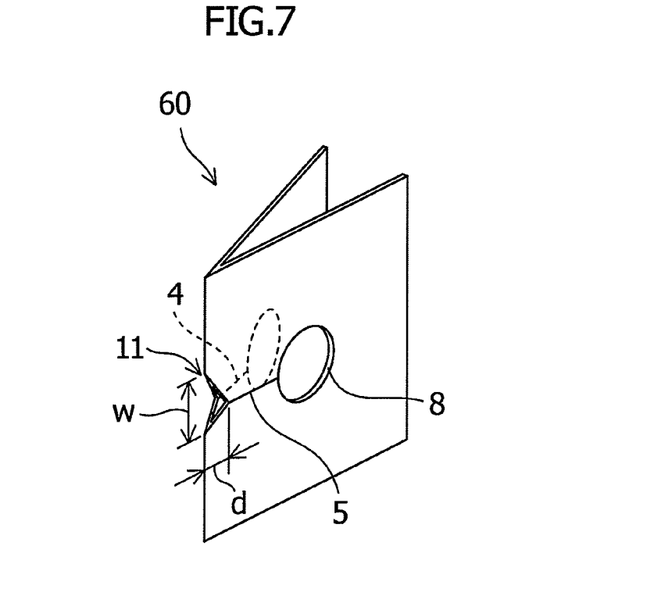
FIG. 7 illustrates one embodiment of a sustained release pheromone formulation comprising, at the bend part thereof, a notch which communicates with the slits thereof.

Preferably, in the bend part, there is a notch having a width w in the vertical direction of the bent part (i.e., the direction perpendicular to the direction connecting the centers of two engaging holes) and a depth d in the direction along the slits extending between the bend part to each engaging portion. By forming the notch that opens at a portion receiving the rod-shaped support to the slits, guiding the rod-shaped support to the engaging holes through the slits and engaging the rod-shaped support with the engaging holes is facilitated. FIG. 7 illustrates the sustained release pheromone formulation 60 comprising a notch 11. From the viewpoint of simple engagement between a tree branch and the engaging holes, it is preferable that the width w of the notch in the longitudinal direction of the bend part be slightly greater than the diameter of the rod-shaped support such as a tree branch. However, if the width is excessive, the likelihood of falling off of the formulation increases. Thus, preferably, the width w is in the range from 3 to 15 mm, and the depth d at this time is in the range from 4 to 20 mm.

When illustrated in a development view, the notch illustrated in FIG. 7 has a diamond shape in which lines w and d are diagonal lines. The shape of the notch may include, but not limited thereto, a round shape (w and d correspond to the diameter), an elliptical shape (w and d respectively correspond to a major diameter and a minor diameter), and a rectangular shape (w and d correspond to diagonal lines).

Figure 8:
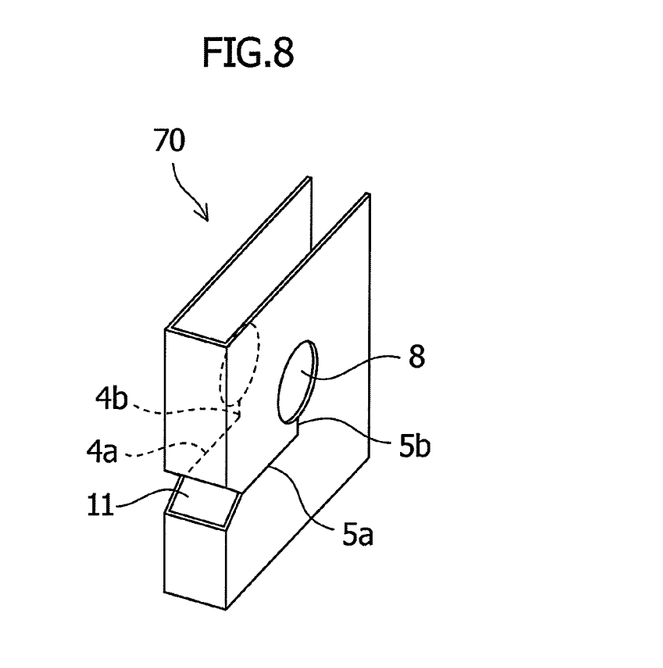
FIG. 8 illustrates one embodiment of a sustained release pheromone formulation comprising a notch at the bend part thereof, and slits are cut so that each slit extends along lines that form an angle.
Figure 9:
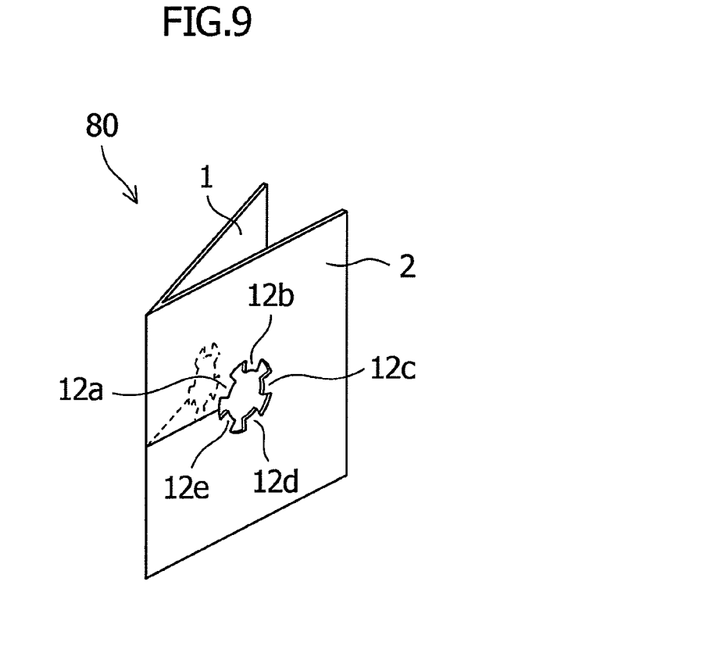
FIG. 9 illustrates one embodiment of a sustained release pheromone formulation comprising at least one protrusion that extends inwardly from the peripheral edge of each engaging hole.

FIG. 8 illustrates the sustained release pheromone formulation 70 comprising a notch 11, and the slits respectively extending from its beginning end located at the bend part to its terminal end located on each peripheral edges of the engaging holes define lines 4a and 4b and lines 5a and 5b, each pair of lines form an angle It is preferable that each engaging hole has therein at least one protrusion that inwardly extends from a part of the peripheral edge of the engaging hole except a point on which the terminal end of each slit is located. When the intended rod-shaped support is guided to and engaged with the engaging holes, such protrusion catches the rod-shaped support so that the securement to the rod-shaped support is made stronger. The protrusion may be provided by adhering a polymer material for forming the protrusion to the peripheral edge of the engaging hole. However, from the production viewpoint, it is preferable to integrally form an engaging hole with a protrusion by punching such a hole from a polymer sheet. FIG. 9 illustrates the sustained release pheromone formulation 70 provided with protrusions 12.

Taking into consideration ease of machining and force for holding the rod-shaped support, the number of the projections is preferably three to 16 for each engaging hole, but this is not limited thereto. The protrusions that extend inwardly from the peripheral edge may have any length as long as they do not prevent engagement between the rod-shaped support and the engaging hole. An excessively long protrusion may cause a problem in terms of strength. Thus, it is preferable that the length of the protrusion be in the range from 1 to 6 mm, and the width in the circumferential direction at this time be in the range from 1 to 8 mm. The number and shape of the protrusions may be the same or different between the two engaging holes. However, from the viewpoint of production, it is preferable that the number of the protrusions and the shapes of the protrusions be the same between the engaging holes, so that the two engaging holes including such protrusions are a symmetrical pair.

Figure 10:
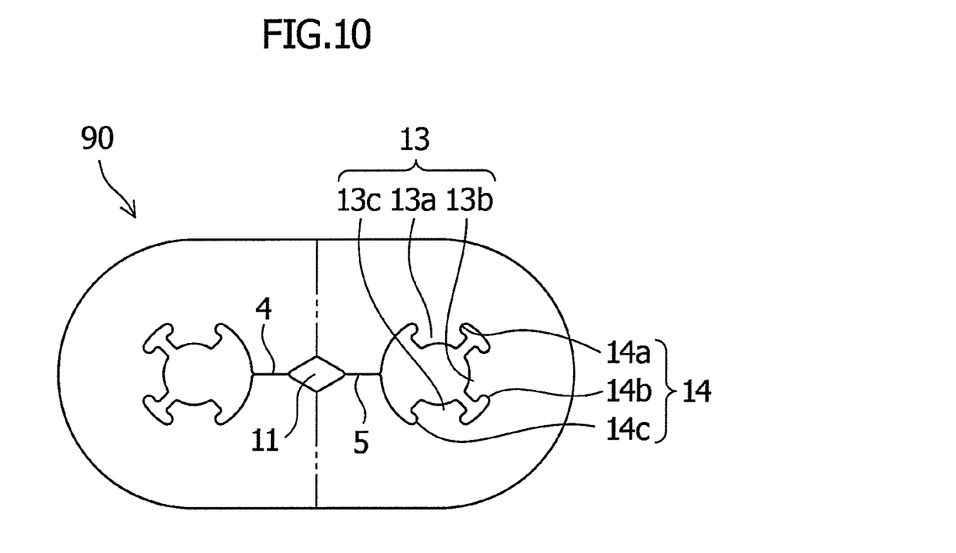
FIG. 10 is a development view illustrating one embodiment of a sustained release pheromone formulation comprising a protrusion with a constriction.
Figure 11:
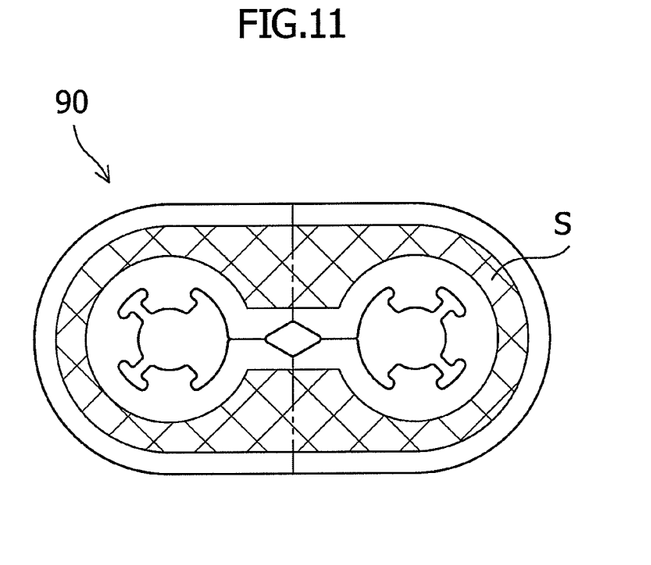
FIG. 11 illustrates one embodiment of a range for placing at least one sex pheromone substance in the sustained release pheromone formulation illustrated in FIG. 10.

Preferably, each protrusion has a constriction. The constriction is a portion that is a middle or bottom portion of the protrusion and that is narrow compared with other portions thereof. Considering the area around the engaging hole is a body, the protrusion has a neck portion that is the constriction above and a head portion followed therefrom. Thus, the circumferential length at the middle or bottom portion of the protrusion is made shorter than the circumferential length of the top portion of the protrusion. FIG. 10 illustrates a development view of the sustained release pheromone formulation 90 before bending, which comprises protrusions 13 and constrictions 14 and which is provided by bending once a polymer sheet. In FIG. 10, there are three protrusions 13*a* to 13*c* and three constrictions 14*a* to 14*c*. By providing the constrictions, it becomes possible to prevent stress concentration and cracking at the bottoms of the protrusions. FIG. 11 illustrates one embodiment of a range for placement of at least one sex pheromone substance within the sustained release pheromone formulation 90 illustrated in FIG. 10.

For the protrusion having a constriction, the inwardly extending length of the protrusions is preferably in the range from 3 to 6 mm. At this time, the width, in the circumferential direction of the engaging hole, of the head portion of the protrusion is preferably in the range from 3 to 12 mm, and the width, in the circumferential direction of the engaging hole, of the neck portion of the protrusion is preferably in the range from 2 to 10 mm. One or some or all of the protrusions in one engaging hole may have a constriction or constrictions. One or some or all of the protrusions in one or both of the engaging holes may have a construction or constructions. However, from the viewpoint of production processing, it is preferable that the engaging holes be a symmetrical pair of holes including the protrusions.

The present invention is derived from the shape of sustained release pheromone formulation, and provides a sustained release pheromone formulation which can be quickly secured to a rod-shaped support such as a tree branch, and which, after being secured, has low possibility of falling off even if exposed to wind and rain. Thus, the type and amount of the pheromone substance to be used, and the type of polymer used for the polymer sheet, may be those similar to conventional ones.

Examples of the pheromone substance include, but not limited to, aliphatic linear alcohols having 10 to 18 carbon atoms, aliphatic linear acetates having 12 to 20 carbon atoms, aliphatic linear aldehydes having 12 to 20 carbon atoms, and aliphatic linear ketones having 10 to 23 carbon atoms (including the number of functional group carbon atoms). For ease of availability, a synthetic pheromone substance may be used. The pheromone substance may be one pheromone substance or may be a combination of at least two pheromone substances. Furthermore, the pheromone substance may be targeted for a single kind of insect pest, or may be targeted for at least two kinds of insect pests.

A synthetic pheromone substance may be used together with a coloring agent and/or a stabilizer such as an antioxidant and an ultraviolet light absorber.

A polymer material to be used for forming polymer sheet may be the same as a conventional polymer material. For example, a polymer material which can allow a pheromone substance to penetrate therethrough and to be released outside from the surface thereof, is preferable. Such a polymer material includes a low density polyethylene, a high density polyethylene, polypropylene, ethylene vinyl acetate copolymer, polyester, and copolymers thereof. In addition, a plasticizer, a stabilizer, and/or a various processing aid may be added thereto.

When using a sheet formed of two polymer films that are adhered one on the other, these two polymer films may be laminated. When a single sheet in which at least one pheromone substance is kneaded or a sheet formed of two polymer films which are adhered one another, the thickness of the former sheet and the total thickness of these films are preferably in the range from 50 to 600 pill, in view of strength as a formulation.

The sustained release pheromone formulation of the invention may be reinforced at a region around the engaging hole and/or the notch. Examples of such reinforcement include: increasing the thickness of a portion to be reinforced by using a polymer material, which is the same kind of polymer material from which the polymer sheet is formed, as a reinforcement material; increasing the thickness of a portion to be reinforced by adhering thereon a reinforcing material having higher strength which is different from that of the polymer sheet; replacing a polymer material at a portion to be reinforced by the reinforcing material; and inserting a reinforcing material such as a metal into a portion to be reinforced.

EXAMPLES

Hereinafter, the present invention will be described with Examples. However, the present invention is not limited thereto.

Example 1

A film having a thickness of 0.30 mm was prepared by extrusion using a copolymer of polybutylene succinate and polybutylene sebacate (product name: BIONOLLE, produced by Showa Highpolymer Co., Ltd.). Each oval film of 37 mm long and 71.3 mm wide illustrated in FIG. 10 was provided by punching the film. In this example, the inwardly extending length of a protrusion in an engaging hole was 3.8 mm; the width, in the circumferential direction of the engaging hole, of the head portion of the protrusion, was 7.6 mm; and the width, in the circumferential direction of the engaging hole, of the neck portion of the protrusion was 5.2 mm. The notch at the bend portion had a width w of 11 mm, and a depth d of 13 mm. Then, a nonwoven fabric made from cotton linter (product name: BEMCOT, produced by ASAHI Kasei Fibers Corp.) was punched to have a shape illustrated in FIG. 11.

After impregnated with 200 mg of Z8-dodecenyl acetate, which is sex pheromone of the oriental fruit moth, the nonwoven fabric was placed between the two oval films. Then, the two films were heat-sealed along the peripheral edges thereof, thereby providing a sustained release pheromone formulation of 37 mm long and 71.3 mm wide.

Figure 12:
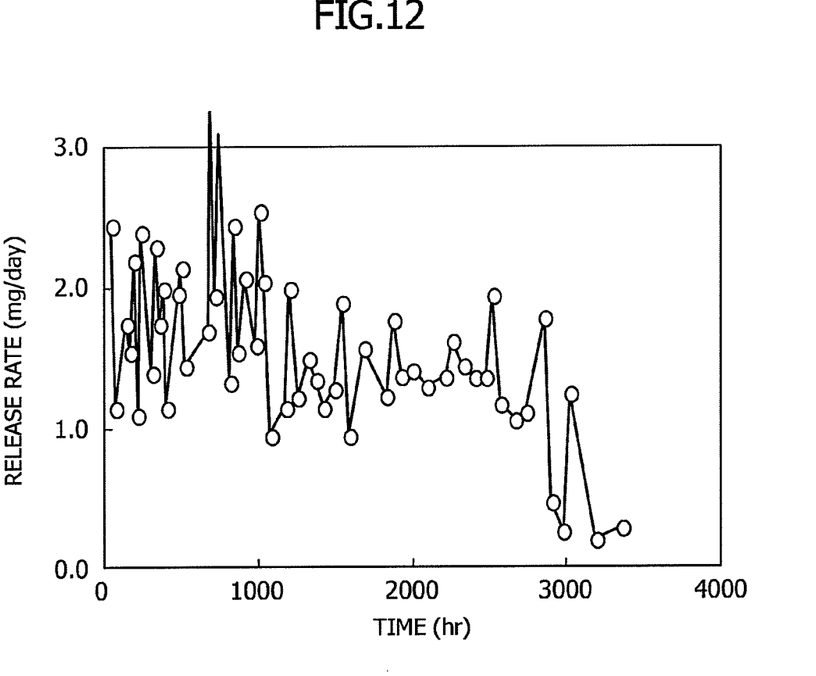
FIG. 12 is a graphical representation of change of a Z8-dodecenyl acetate release rate with respect to time.

The results of measuring the pheromone release rate of the sustained release pheromone formulation under the conditions of wind speed 0.7 m/s at a temperature of 25° C. are shown in FIG. 12. As seen from FIG. 12, sustained release of pheromone substance was maintained at a uniform rate over a long period of time.

Example 2

A film having a thickness of 0.35 mm was prepared by extrusion using a copolymer of polybutylene succinate and polybutylene sebacate (product name: BIONOLLE, produced by Showa Highpolymer Co., Ltd.). Each oval film having a shape illustrated in FIG. 10, was provided by punching the film prepared by extrusion in the same manner as in Example 1. Then, a nonwoven fabric made from cotton linter (product name: BEMCOT, produced by Asahi Kasei Fibers Corp.) was punched to have a shape illustrated in FIG. 11. After impregnated with 200 mg of Z8-dodecenyl acetate, which is sex pheromone of the oriental fruit moth, the nonwoven fabric was placed between the two oval films. Then, the two films were heat-sealed along the peripheral edges thereof, thereby providing a sustained release pheromone formulation.

Then, 2500 pieces of the sustained release pheromone formulations thus obtained were attached to apple trees in a 5 ha apple orchard so that the formulations were uniformly distributed in the orchard. The attaching work was easy, and the work efficiency was 50 minutes/ha/worker. The formulations could be easily attached to branches of fruit trees. After being left for 5 or more months in an orchard, the formulations were kept at the initial places without displacement of disturbing the initial uniform arrangement of the formulations, and did not fall off from the branches.

Comparative Example 1

Each high density polyethylene tube having an inner diameter of 1.2 mm, a wall thickness of 0.55 mm and a length of 200 mm, was combined with an aluminum wire having a diameter of 0.9 mm so that they were arranged parallel to one another. Each tube was filled with 200 mg of Z8-dodecenyl acetate, which is sex pheromone of the oriental fruit moth, and the opposite ends of the tube were sealed, thereby providing each sustained release pheromone formulation.

Then, 2500 pieces of the sustained release pheromone formulations thus obtained were attached by tying to apple trees in a 5 ha apple orchard so that the formulations were uniformly distributed in the orchard. The attaching work efficiency was 150 minutes/ha/worker. After 5 months, the formulations had displacement from the initial places so that the initial uniform arrangement of the formulations was disturbed.

The invention claimed is:

1. A sustained release pheromone formulation comprising:
   a first sheet part and a second sheet part that are provided by bending a single polymer sheet so that the first and second sheet parts are arranged face-to-face, the first and second sheet parts each having an engaging hole therethrough;
   a bend part located between the first sheet part and the second sheet part;
   at least one sex pheromone substance that is carried on at least a part of the first and second sheet parts; and
   slits, each having a beginning end and a terminal end and extending therebetween, the beginning end being located at the bend part and the terminal end being located on each peripheral edge of the engaging holes in the first and second sheet parts,
   wherein the sustained release pheromone formulation can be secured to a rod-shaped support by guiding the rod-shaped support through the slits into the engaging holes and engaging the rod-shaped support with the engaging holes, and
   wherein the single polymer sheet is provided by adhering two polymer films to one another, and the pheromone substance is disposed between the two polymer films and in the bend part therebetween, and is penetrable through the two polymer films.

2. The sustained release pheromone formulation according to claim 1, comprising a notch connected to the slits in the bend part, the notch having a width in a longitudinal direction of the bend part and facilitating to guide the rod-shaped support from the notch to the engagement holes through the slits and to engage the rod-shaped support with the engagement holes.

3. The sustained release pheromone formulation according to claim 1, further comprising a nonwoven fabric between the two polymer films, wherein the nonwoven fabric is impregnated with the pheromone substance.

4. The sustained release pheromone formulation according to claim 1, further comprising at least one protrusion that inwardly extends from a part of a peripheral edge of each engaging hole except a point on which the terminal end of each slit is located, wherein the protrusion has a constriction neck portion and a head portion followed from the neck portion.

5. The sustained release pheromone formulation according to claim 2, further comprising at least one protrusion that inwardly extends from a part of a peripheral edge of each engaging hole except a point on which the terminal end of each slit is located, wherein the protrusion has a constriction neck portion and a head portion followed from the neck portion.

6. The sustained release pheromone formulation according to claim 3, further comprising at least one protrusion that inwardly extends from a part of a peripheral edge of each engaging hole except a point on which the terminal end of each slit is located, wherein the protrusion has a constriction neck portion and a head portion followed from the neck portion.

7. The sustained release pheromone formulation according claim 1, wherein at least one of the slits does not define a single straight line that extends from the bend part to each engaging hole, but define any line, including a line with an angle, a curved line, and a combination thereof.

8. The sustained release pheromone formulation according claim 4, wherein at least one of the slits does not define a single straight line that extends from the bend part to each engaging hole, but define any line, including a line with an angle, a curved line, and a combination thereof.

9. The sustained release pheromone formulation according to claim 4, wherein a circumferential width of the neck portion of the protrusion is shorter than a circumferential width of the head portion of the protrusion in the circumferential direction of the engaging hole.

10. The sustained release pheromone formulation according to claim 5, wherein a circumferential width of the neck portion of the protrusion is shorter than a circumferential width of the head portion of the protrusion in the circumferential direction of the engaging hole.

11. The sustained release pheromone formulation according to claim 6, wherein a circumferential width of the neck portion of the protrusion is shorter than a circumferential width of the head portion of the protrusion in the circumferential direction of the engaging hole.

* * * * *